United States Patent [19]

Petersen et al.

[11] Patent Number: 4,882,933
[45] Date of Patent: Nov. 28, 1989

[54] ACCELEROMETER WITH INTEGRAL BIDIRECTIONAL SHOCK PROTECTION AND CONTROLLABLE VISCOUS DAMPING

[75] Inventors: Kurt E. Petersen, San Jose; Phillip W. Barth, Palo Alto, both of Calif.

[73] Assignee: NovaSensor, Fremont, Calif.

[21] Appl. No.: 202,081

[22] Filed: Jun. 3, 1988

[51] Int. Cl.[4] .............................................. G01P 15/08
[52] U.S. Cl. ................................................. 73/517 R
[58] Field of Search ......................... 73/517 R, 517 B

[56] References Cited

U.S. PATENT DOCUMENTS

| | | | |
|---|---|---|---|
| 4,488,445 | 12/1984 | Aske | 73/517 R |
| 4,498,342 | 2/1985 | Aske | 73/517 B |
| 4,553,436 | 11/1985 | Hansson | 73/517 R |
| 4,598,585 | 7/1986 | Boxenhorn | 73/505 |
| 4,641,539 | 2/1987 | Vilimek | 73/517 R |
| 4,660,418 | 4/1987 | Greenwood et al. | 73/517 R |
| 4,670,092 | 6/1987 | Montamedi | 73/517 R |
| 4,679,434 | 7/1987 | Stewart | 73/517 R |

FOREIGN PATENT DOCUMENTS

| | | | |
|---|---|---|---|
| 61-144576 | 7/1986 | Japan | 73/517 R |
| 2133152 | 7/1984 | United Kingdom | 73/517 R |

OTHER PUBLICATIONS

L. M. Roylance, J. B. Angell, "A Batch-Fabricated Silicon Accelerometer", IEE Transactions on Electron Devices, vol. ED-26, No. 12, Dec. 1979.
Kanda, Yozo, et al., "Silicon Pressure Sensor and an Accelerometer with Four-Terminal-Gauge Utilizing the Shear Stress," Hamamatsu University School of Medicine, Grant-in-Aid fo Scientific Research, Ministry of Education, Science & Culture of Japan (59460054), pp. 406-409.
Robinson, C. et al., "Problems Encountered in the Development of a Microscale g-Switch Using Three Design Approaches," U.S. Army, Harry Diamond Laboratories, Adelphi, MD., pp. 410-413.
Sandmaier, H., "A Silicon Based Micromechanical Accelerometer with Cross Acceleration Sensitivity Compensation," Fraunhofer-Institut für Festkörpertechnologie, Ministry of Research & Development of the Federal Republic of Germany, pp. 399-402.
Tsugai, Masahiro, et al., "Semiconductor Accelerometer for Automotive Controls," Products Development Laboratory, Mitsubishi Electric Corporation, Hyogo, Japan, pp. 403-405.
Rudolf, Felix, et al., "Silicon Microaccelerometer," Centre Suisse d'Electronique et de Microtechnique S.A., European Space Agency, pp. 395-398.
Tenerz, L., et al., "Silicon Cavity Structures Fabricated with a New Technique," Institute of Technology, University of Uppsala, Uppsala, Sweden, Swedish Board for Technical Development, pp. 1-4.
Lasky, J. B., et al., "Silicon-on-Insulator (SOI) by Bonding and Etch-Back," IEDM 85 (1985), pp. 684-687.
Nakamura, Masashi et al., "Novel Electrochemical Micro-Machining and Its Application for Semiconductor Acceleration Sensor IC," Institute of Electrical Engineers of Japan, Digest of Technical Papers (1987), pp. 112-115.
Ohashi, H., et al., "Study of Si-Wafer Directly Bonded Interface Effect on Power Device Characeristics," IEDM 87 (1987), pp. 678-681.

Primary Examiner—Michael J. Tokar
Assistant Examiner—Robert P. Bell
Attorney, Agent, or Firm—Townsend and Townsend

[57] ABSTRACT

A micromachined accelerometer includes integral bidirectional shock protection and controllable viscous damping. The accelerometer includes a frame in which a seismic mass is disposed and coupled to the frame by one or more cantilever beams. Upper and lower stops are provided around the periphery of the seismic mass and around the interior of the frame to limit the travel distance of the seismic mass. The accelerometer is fabricated, preferably from monocrystalline silicon, by defining an annular recess which extends into a first surface of a silicon substrate. Next, a layer is formed over the surface of the substrate but not in contact with the lower surface of the recessed region. An annular-shaped region of the substrate extending from the bottom surface of the substrate to the layer is then removed to define the seismic mass and frame. Finally, portions of the layer are removed to define the cantilever beams and integral bidirectional stops.

34 Claims, 4 Drawing Sheets

FIG_8b.

ACCELEROMETER WITH INTEGRAL BIDIRECTIONAL SHOCK PROTECTION AND CONTROLLABLE VISCOUS DAMPING

BACKGROUND OF THE INVENTION

1. Field of the Invention

This invention relates to accelerometers, and in particular, to a silicon micromechanical accelerometer having integral bidirectional shock protection and viscous damping.

2. Description of the Prior Art

Many micromechanical devices are now well known. Such devices includes sensors of all types, for example, for sensing force, pressure, acceleration, chemical concentration, etc. These devices are termed "micromechanical" because of their small dimensions—on the order of a few millimeters square or smaller. The small size is achieved by employing photolithographic technology similar to that employed in the fabrication of integrated circuits. With this technology, the devices are as small as microelectronic circuits, and many such devices often are fabricated in a batch on a single wafer or other substrate, thereby spreading the cost of processing that wafer among many individual devices. The resulting low unit cost enormously increases the applications for such devices. In addition, by forming such devices on a semiconductor substrate such as a silicon wafer, associated control and/or sensing circuitry may be formed on the same substrate during the same processes, thereby further increasing density and reducing cost.

One type of micromechanical device—an accelerometer—has been fabricated by a number of individuals. A silicon accelerometer developed by Lynn M. Roylance is reported in *Scientific American* (April 1983) 248(4):44–55, in an article entitled, "Silicon Micromechanical Devices" by J. B. Angell, S. C. Terry and P. W. Barth, one of the inventors herein. That article describes the use of selective chemical etching to create an accelerometer having a mass of silicon suspended at the end of a thin silicon beam in which a resistor is formed. Subjected to acceleration, the mass is displaced, causing flexure of the beam, thereby changing the resistance of the resistor. The change of resistance provides an accurate measure of the acceleration. Other well known micromechanical accelerometers are described in the prior art statement accompanying this application.

Several market forces have pushed the development of low-cost batch-fabricated accelerometers over the past few years. Primary along these are automotive needs for crash sensors for air bag deployment and ride motion sensors for active suspension components. Additional markets include military components such as smart weapons and aviation instruments such as rate-of-climb indicators. Accelerometer development efforts have pushed for medium performance (less than required for inertial navigation or gravitometers), reproducible characteristics, and low cost. The primary obstacle to the development of such sensors has been the fragility of the fabricated devices: adequate sensitivity for low accelerations (0.5–1 G) has historically resulted in easy breakage of the sensor during and after fabrication. This breakage problem drives yield down and price up.

Unfortunately, such prior art acceleration sensors have suffered from a number of disadvantages which have raised their cost of manufacture, limited their accuracy, and precluded their use in many applications. For example, for greater sensitivity to small acceleration forces, the cantilever beam suspending the mass must be more flexible, thereby requiring stops to control the displacement of the mass when subjected to larger acceleration forces. The stops prevent the mass from being displaced to the extent that the cantilever beam cracks, rendering the structure nonfunctional. In the prior art such stops were provided by separate mechanical means such as plates or arms supported externally of the moving part of the acceleration sensor, and supporting frame, thereby requiring additional manufacturing, alignment and adjustment steps, each adding cost to the product while reducing yield. Even with the additional process requirements, the accuracy of such stops is not as great as desired. Furthermore, it was almost impossible to match the travel distance of the mass in each direction (positive or negative g's) because of the difficult adjustment and alignment presented by the external stops. Such external stops also trap dust particles between the mass and the stops during fabrication of the stops, again degrading yield. A typical prior art approach for the formation of stops is described by M. Nakamura, et al., "Novel Electrochemical Micro-Machining and Its Application for Semiconductor Acceleration Sensor IC," Digest of Technical Papers, 4th International Conference on Solid-State Sensors and Actuators, Institute of Electrical Engineers of Japan, pp. 112–115.

A further disadvantage of prior art micromachined acceleration sensors is the difficulty of providing adequate damping. Damping of the sensor is required for use of the sensor near its resonant frequency. In the prior art damping was provided by the introduction of oil or other viscous fluid into the sensor. This made control of the precise damping characteristic difficult. Furthermore, the damping provided by these techniques was often at least partially dependent on the stop characteristics, thereby precluding independent control of damping and travel distance.

SUMMARY OF THE INVENTION

We have developed an accelerometer having integral bidirectional shock protection and accurately controllable viscous damping. The micromachined accelerometer of our invention allows sensitivity to low acceleration forces, for example, less than a tenth of a g, yet incorporates mechanical stops to prevent breakage due to shock from dropping, mounting or other over-acceleration. In our accelerometer the same mechanical stop structures provide viscous damping during device operation. In the preferred embodiment of our invention, the accelerometer includes a supporting frame which has an opening within which a seismic mass is disposed, which mass is movable along at least one axis. Thus, cantilever beams are coupled between the frame and mass to detect displacement of the mass with respect to the frame. Upper and lower stops integral to the supporting frame and the mass are provided for restricting movement of the mass to between two positions along its axis of travel. Both the mass and supporting frame typically are formed primarily from a semiconductor substrate, such as silicon, while the cantilever beam and the upper and lower stops are formed from an overlying layer, such as epitaxial silicon or other materials. Recesses formed in the substrate under the overlying layer allow a single pattern defined in the overlying layer to provide the stops, which in turn strike the recesses when the mass is displaced sufficiently in either direction along the axis. The depth of the recesses allows highly accurate control of the limit of travel of the mass.

In the preferred embodiment, the mass is affixed to the frame with a pair of spaced-apart cantilever beams to provide additional rigidity of the structure in all directions other than along the desired axis of travel. Control of the viscous damping characteristics of the structure is achieved by adjustment of the spacing, depth, and width of the stops and recesses, all of which dimensions may be controlled with submicron accuracy and repeatability. This allows control of the damping characteristics independently of the stop characteristics.

The accelerometer of our invention is fabricated by first defining an annular recess which extends into a first surface of a substrate, the bottom of the recess defining a second surface in the substrate. Next, a layer of material is formed across the surface and over the recess, but not in contact with the bottom of the recess. Typically, this step is achieved by laminating by means of various bonding techniques, such as silicon bonding, an independently fabricated layer to the upper surface of the structure. The remaining steps may be performed in different orders; however, in the preferred embodiment we next remove an annular-shaped region of the substrate which extends from the bottom surface of the substrate to the recess, thereby defining the seismic mass and surrounding frame. At this stage, were it not for the layer formed over the surface of the substrate, the seismic mass would be completely separate from the frame. Finally, we remove a selected portion of the overlying layer to define the cantilever beams and to define the stops. At any desired stage of the process, resistors may be formed in the cantilever beam or beams, and additional circuitry may be formed at desired locations on and in the accelerometer using well known integrated circuit fabrication technology.

BRIEF DESCRIPTION OF THE DRAWINGS

FIGS. 2 through 8 illustrate fabrication of the accelerometer, with FIG. 2 illustrating a cross section of a wafer following a conventional photolithographic masking operation;

DETAILED DESCRIPTION OF THE PREFERRED EMBODIMENTS

Figure 1A:
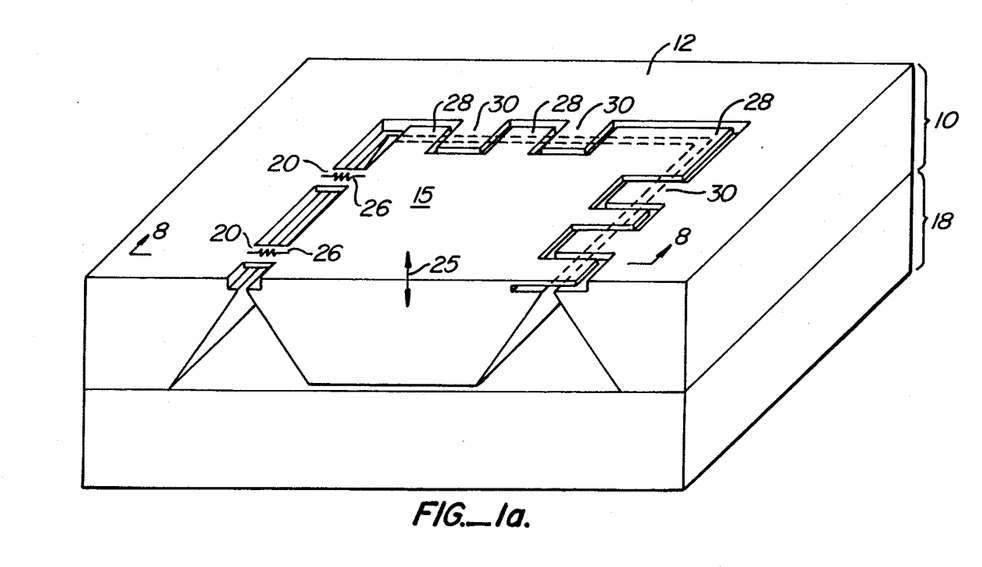
FIG. 1a is a perspective view of a completed accelerometer illustrating its annular frame, seismic mass, cantilever beams, and stops.

FIG. 1 is a perspective view of an accelerometer with integral bidirectional shock protection and adjustable viscous damping. The structure may be fabricated according to the preferred embodiment of the process of this invention. The structure of FIG. 1 includes a silicon substrate 10 which has been defined into a frame 12 and seismic mass 15. A glass plate 18 is affixed to the bottom of the accelerometer to increase its structural strength, maintain an interior free of contaminants, and facilitate packaging. A narrow space is formed by this glass plate and the mass. This recess provides an additional stopping mechanism and also a constricted space through which air must flow, thus providing a damping medium. The accelerometer includes a pair of cantilever beams 20 which affix seismic mass 15 to frame 12. Of course, other types of flexure or beam arrangements, for example, suspending the seismic mass along one edge, are also suitable. For instance, a single cantilever, an arrangement of two or more doubly clamped beams, flexures which provide torque movement, as well as others which can be readily envisioned by one skilled in the art are suitable. We have used the term "flexure" herein to denote the means by which such mass is coupled to the frame, whether by cantilever beam or otherwise. In the preferred embodiment, the upper surface of the beams 20 is coplanar with the upper surfaces of both the frame and mass. Because the seismic mass is separated from the frame everywhere other than at the cantilever beams 20, it is free to move along an axis 25 when subjected to acceleration in that direction. Axis 25 is actually the radius of a circle having a center at cantilever beams 20; however, for the extremely small displacements involved, the axis is represented as a straight line herein. Each of the cantilever beams includes a resistor or resistors 26 formed in the beam, typically at the points of maximum stress. The resistance of the resistors 26 changes with stress induced when the beam flexes, enabling measurement of the amount of flexure, and thus the acceleration to which the structure is subjected. Such measurements may be made using conventional Wheatstone bridge circuits or the like (not shown).

Figure 1B:
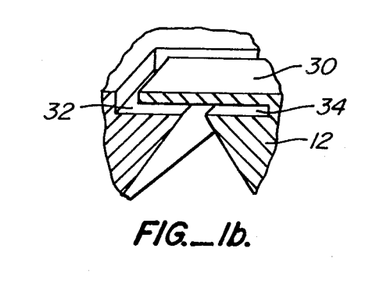
FIG. 1b is an expanded view of a portion of FIG. 1a illustrating a stop preventing travel of the mass beyond a fixed distance in an upward direction.
Figure 1C:
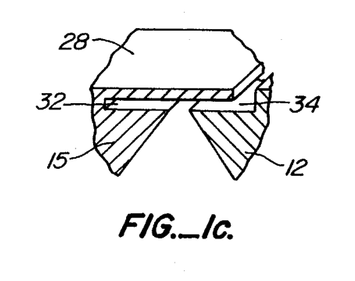
FIG. 1c is an expanded view of a portion of FIG. 1a illustrating a stop preventing motion of the mass beyond a desired limit in the downward direction.

Disposed about the periphery of the seismic mass 15 are a series of protrusions 28 which extend across the opening between the seismic mass 15 and the frame 12 over a recessed area in the frame, for example, as shown more clearly in FIG. 1c. Similarly, a series of protrusions 30 extend inwardly from the inner periphery of the frame 12, across the opening between the mass and the frame, and terminate over recesses in the seismic mass 15. These protrusions are shown more clearly in FIG. 1b. The protrusions from the frame and the mass define stops which prevent the mass from traveling too far in either direction along axis 25. Under high acceleration or deceleration, seismic mass 15, without these stops, would travel sufficiently far with respect to frame 12 to fracture the cantilever beams 20, destroying the functionality of the device.

The geometry of the stops is novel and allows a cost effective fabrication process with only two primary layers forming the flexure, frame and stops. An accelerometer structure of the prior art typically is composed of a moving part, support frame, top stop, and a bottom stop formed from three or four principal layers. This invention, however, accomplishes these functions with two principal layers through a novel, cost effective, and precisely controlled integrated circuit micromachining process. The operation of the stops may be more clearly seen in FIGS. 1b and 1c. In FIG. 1c, protrusion 28 from seismic mass 15 is shown in greater detail. A small recess 32 separates the protrusion 28 from the seismic mass 15, but is not required for operation. A corresponding small recess 34 in frame 12, however, defines the limit of travel of seismic mass 15 downward. In particular, once the mass moves downward by a distance equal to the depth of recess 34, the protrusion 28 contacts the bottom surface of the recess in frame 12 and prevents further downward travel of the seismic mass 15. In the preferred embodiment only an integral silicon mass is employed. Clearly, additional mass can be added or the structure of the mass shown can be adapted to be a mass support plate. Thus, the mass can be increased or varied by the addition of, for instance, additional layers or parts. This allows an additional degree of freedom to the accelerometer designer in making effective performance tradeoffs.

In a similar manner, as shown in FIG. 1b, a protrusion 30 from frame 12 extends over a recess 32 in mass 15. The depth of this recess defines the maximum upward travel of mass 15, because after traveling distance 32, mass 15 contacts protrusion 30 and can travel no further.

Overrange protection exists in all three axes. In the Z-axis (perpendicular to the chip surface) protection is provided by the interlocking tabs described above. In the X-axis (in the plane of the chip and parallel to the length of the beams), protection is provided by the strength of the beams themselves in linear tension and compression. The cross-sectional area of such beams is greater than it would be for a doubly-fixed beam design of equal sensitivity, so that overrange protection in the X-direction is greater. In the Y-axis (in the plane of the chip and perpendicular to the length of the beams), protection is provided by the great width of the cantilever beams in relation to their thickness, plus the wide separation of the beams, both of which provide great strength and stiffness in this direction.

As shown by FIGS. 1a-1c, the stops provided by the accelerometer of our invention are integral with the accelerometer itself. The travel distance of the seismic mass is controlled accurately by the depth of the corresponding recesses. The structure of the protrusions and recesses allows control of the viscous damping characteristics of the accelerometer. By enlarging (or shrinking) the spacing, depth, and width of the protrusions and recesses, it becomes easier (or more difficult) for air or any other fluid in the accelerometer to move through the narrow openings, thereby varying the damping characteristics.

An important advantage of the geometry employed for the fabrication of the stops is that it is readily micromachined. Thus, precise dimensional control is achieved because of the precision available with this process at low cost. The very effective overrange protection is achievable even with the small deflection present in a microchip sensor of a minimum size. The stop may be accurately and reproducibly set to just over the full scale range, thus ensuring a very high overrange. Furthermore, in a small size sensor, limited area is available for viscous damping. The ability to make very narrow well controlled gaps means that effective damping is possible even in such structures.

All accelerometer designs include compromises among sensitivity, resonant frequency, and damping of undesirable resonances. Increased sensitivity generally results in lowered resonant frequency, and the lowest resonance limits the available measurement bandwidth. The sensitivity-bandwidth tradeoff is basic to any design in which the sensing element is placed directly on the bending beam, and can be avoided to some extent only by structures which remove the sensing element from the plane of the bending beam. This sensor uses a fully active Wheatstone bridge to achieve the highest resonant frequency and highest sensitivity simultaneouslY possible.

Undamped accelerometers suffer serious measurement problems from oscillations occurring at resonance. (Undamped buildup of these oscillations can also lead to destruction of the device if no overrange protection is present.) To avoid measurement errors the oscillation must be damped to some extent; ideally, critical damping is preferred, which avoids oscillation while preserving signal amplitude to a frequency near the cutoff ($-3dB$) frequency, and results in a well-characterized phase lag at frequencies near cutoff.

Both liquid damping and gas damping are possible. Liquid damping suffers from several problems: reduction of sensitivity due to density of the liquid (which tends to buoy the seismic mass), viscosity variation with temperature, and costs associated with both the liquid material and the liquid filling procedure. Gas damping, in contrast, has minimal problems related to density and viscosity, and if the gas is air at atmospheric pressure, it costs nothing. Air damping is thus the method of choice if it can be efficiently designed into the sensor structure.

The present sensor design achieves air damping by using controlled gaps in the chip structure. Beneath the seismic mass a gap between glass and silicon constitutes one air-damping area. Another gap between the overrange protection elements constitutes another such area. These gaps can be set independently, as can the areas bounded by those gaps. The result is great freedom in designing the air-damping characteristics for the chip. For low-G-Range devices the gaps can be fairly wide and can occupy minimal areas, while for high-G-range chips the gaps can be narrower and can occupy larger areas. Of course, there are also engineering tradeoffs involved between the overrange protection and the damping provided by the gap regions. As will be explained in greater detail below, the manufacturing process allows the dimensions of these features to be controlled with submicron accuracy and repeatability, thereby providing close control over damping characteristics. While air damping is employed in the preferred embodiment, other gases may be employed as well. Moreover, the pressure of the gas may be varied. Thus, greater or lesser damping may be achieved independently of the precise geometry of the stops, allowing independent control of the two important parameters of overrange and damping ratios.

Figure 2:
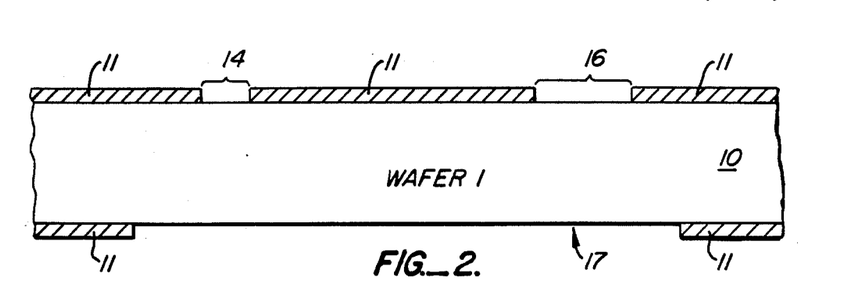

The method by which the accelerometer of our invention is fabricated is described below in conjunction with FIGS. 2 through 8. FIG. 2 is a cross-sectional view of a wafer 10 from which most of the seismic mass 15 and frame 12 will be fabricated. In the preferred embodiment of our invention, the first step performed in the fabrication process is to define the depth of the recesses beneath the cantilever beams and stops. This is achieved by first defining one or more layers of masking material 11 on the surfaces of the wafer 10 as shown in FIG. 2. Such masking regions may be formed using a variety of well known semiconductor fabrication techniques. For example, a layer of photoresist may be deposited across the wafer and exposed using a mask, then developed to define the regions shown. Alternatively, other types of masking material, for example, silicon dioxide or silicon nitride, may be defined across the wafer and patterns formed therein using photoresist or other techniques. These layers of silicon dioxide, or other materials, then may be themselves used as a mask to define the locations of the recesses. In the preferred embodiment the desired recessed region will have an annular planform with a narrower width 14 where the cantilever beams are desired and a greater width 16 where the stops are desired. A larger recess 17 will be formed in the back of the wafer to space the seismic mass from the backing plate 18 (see FIG. 1) later applied.

Figure 3:
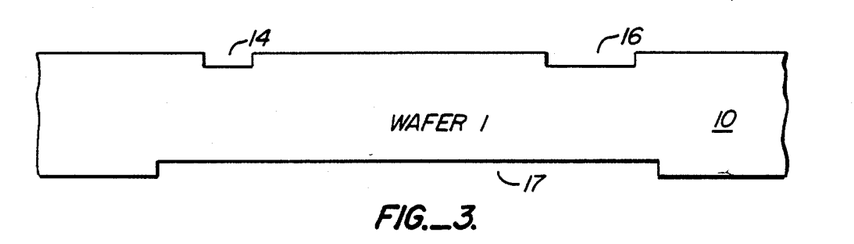
FIG. 3 illustrates the same wafer after etching of its surfaces.

As next shown in FIG. 3, using the mask, the exposed silicon surfaces of wafer 10 are etched. If relatively vertical sidewalls are desired on the sides of the recessed regions, an anisotropic etchant may be employed, for example, reactive ion etching, plasma etching, or etching in a hot alkaline solution. Alternatively, if a more rounded cross-sectional recessed regions are desired, or if undercutting the mask 11 is desired, an isotropic etchant may be employed, for example, isotropic plasma etching or an acid mixture containing hydrofluoric, nitric and acetic acids. In either event, the etching process is allowed to continue for a desired period of time to result in recesses 14, 16, and 17 of the desired depth—in the preferred embodiment, between 10 and 20 microns. Should a different depth be desired on the front of the wafer than the back, then two masking and etching operations may be carried out separately to define different depths. Additionally, the depth of the recess on either side of the wafer may be varied by using separate etching steps on that side.

Figure 4:
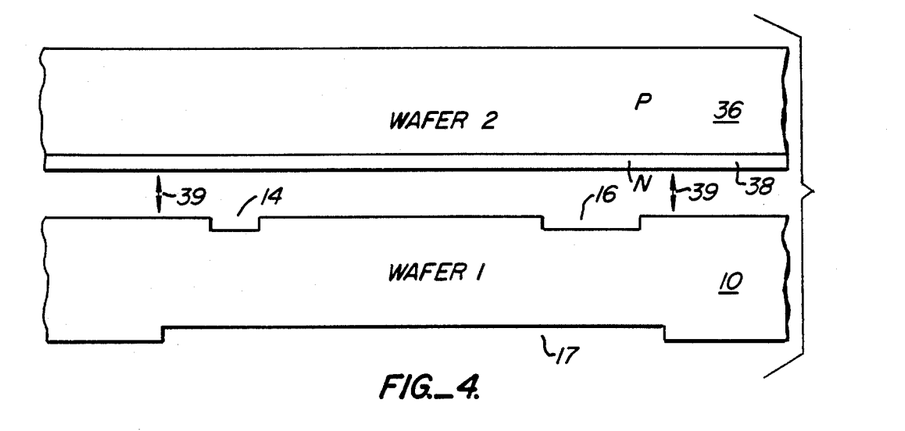
FIG. 4 illustrates the coupling of a second wafer to the structure shown in FIG. 3 to provide the layer in which the cantilever beam and stops are defined.

Following formation of the recesses, a layer is formed across the upper surface of wafer 10. From this layer the cantilever beams and protrusions will be defined. In the preferred embodiment, this layer is achieved by forming a monocrystalline silicon epitaxial layer 38 on a surface of a second silicon wafer 36, again using well known semiconductor fabrication techniques. Preferably epitaxial layer 38 will be about 10 microns thick and doped with opposite conductivity type impurity to that used for the doping of substrate 36. Next, the wafers are cleaned and pressed together as indicated by arrows 39. Then, they are heated to bond layer 38 to wafer 10, thereby creating a sandwich structure with layer 38 between wafers 10 and 36. This silicon-silicon bonding may be achieved using a variety of well known techniques, for example, as described by H. Ohashi, et al., "Study of Si-Wafer Directly Bonded Interface Effect on Power Device Characteristics," *International Electron Devices Meeting* 1987, CH2515-5/87/0000-0678 IEEE, pp. 678-681.

Although the layer 38 has been described as an epitaxial monocrystalline silicon layer, other materials may be employed. For example, the layer may be formed entirely or partially of polycrystalline silicon, silicon nitride, silicon dioxide, metal, or other materials. By forming the epitaxial layer from one or more of these materials, either in separate layers, or in a single layer in which different materials are used in different regions, the beams and protrusions may be formed from different material. For example, the protrusions could include layers of silicon dioxide and silicon nitride over their upper surfaces to strengthen them. Alternatively, the protrusions may remain as silicon, but the beams be formed from silicon nitride or silicon dioxide. Such structures may be achieved using conventional semiconductor fabrication techniques by depositing and defining different layers of materials on substrate 36 before it is bonded to wafer 10.

Figure 5:
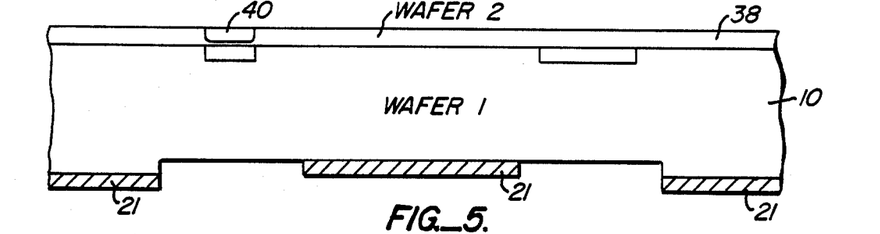
FIG. 5 is a subsequent cross-sectional view illustrating the appearance of the structure after most of the second wafer has been removed.

After the two wafers have been bonded together, typically all of the second wafer other than the epitaxial layer 38 is removed. This step may be performed using any well known technique; however, in the preferred embodiment it is achieved by reverse-biasing the PN junction between the wafer 36 and epitaxial layer 38, then etching the structure in a chemical bath comprising potassium hydroxide and water, hydrazine and water, or ethylenediamine, pyrocatechol and water. The etching process will proceed rapidly until the PN junction is reached, at which the etching essentially stops, thereby leaving only the epitaxial layer 38 as shown by FIG. 5. Of course, other techniques may be employed to remove the bulk of the second wafer. For example, almost all of it may be ground and polished away, then the wafer reverse-biased and the etching completed. The other surface of the wafer may be protected from the etchant in any of several ways, such as by use of deposited layers of silicon dioxide or silicon nitride, by coating the surface with wax, by attaching a glass plate to the surface using wax or epoxy or silicone rubber, or by using mechanical clamping and elastomeric sealing rings to seal the front surface away from the etch.

Once the desired amount, if not all, of the substrate of the second wafer is removed from the structure, circuit elements may be formed in the exposed epitaxial layer 38 using conventional integrated circuit fabrication technology. These circuit elements make the use of a monocrystalline silicon epitaxial layer particularly advantageous. In FIG. 5, a diffused resistor 40 has been formed in the epitaxial layer at the cross section depicted. Not shown are numerous other circuit elements such as additional resistors and transistors, as well as the necessary layers of polycrystalline silicon, aluminum, or other desired electrical interconnections among those circuit elements. Because the fabrication of these circuit elements employs conventional integrated circuit fabrication technology, the steps related to their fabrication are not discussed further herein.

Figure 6:
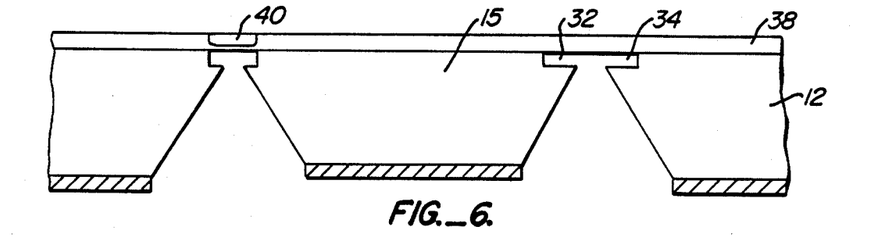
FIG. 6 is a subsequent cross-sectional view illustrating the appearance of the structure after a preferential etch has been employed to almost completely separate the seismic mass from the frame.

After the circuit elements are completed, or at a desired stage in that process, a new mask 21 is formed across the back of wafer 10 to define regions where silicon is to be removed to separate the seismic mass from the frame. Typically, this mask comprises silicon dioxide, silicon oxynitride, silicon nitride, metal films such as chromium and gold, and/or photoresist, and is formed in the same manner as mask 11 in FIG. 2. Next, the structure is subjected to a selective etchant, for example, potassium hydroxide, to etch deep back channels which extend completely through the substrate 10 to the recesses formed in its opposite surface. By employing an anisotropic etching solution, the <111> planes are etched slowly, while other planes are etched more rapidly to form a tapering opening between the frame and mass. As shown by FIG. 6, at this stage of the process the seismic mass 15 is coupled to the frame 12 only by the epitaxial layer 38.

Figure 7:
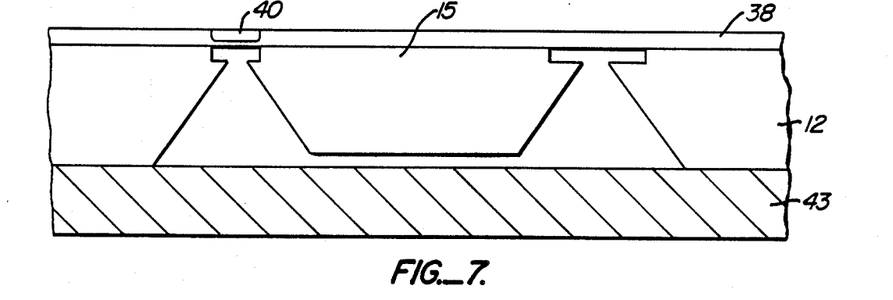
FIG. 7 is a subsequent cross-sectional view illustrating the appearance of the structure after attachment of a backing plate.

Next, as shown by FIG. 7, a glass plate 43 or other suitable material is bonded to the back of frame 12, as well as all other frames on the same wafer. In the preferred embodiment this process is carried out using thermally-assisted anodic glass-to-silicon bonding. Bonding the glass plate 43 to the frame 12 increases the rigidity of the entire structure, without affecting the sensitivity of the resulting accelerometer, thereby enabling the chips to be sawed from the wafer without disturbing the accelerometer. The plate 43 also seals the openings preventing dust or residue from subsequent processes from contaminating the accelerometer and influencing its sensitivity, and increases the effectiveness of the viscous damping by confining air within the sensor, and facilitates packaging. The plate-to-mass gap also provides an additional downward stop. Since the travel of this stop is controlled separately from the protrusion-mass stops, it allows one more degree of freedom to the designer in achieving ideal overrange versus damping characteristics. The recess 17 formed in the back of the wafer earlier in the process, prevents the glass plate 43 from being affixed to the seismic mass 15.

A pattern of photoresist (not shown) is formed across the upper surface of the epitaxial layer 38 to enable defining the pattern for the protrusions. In the preferred embodiment this pattern is serpentine, as shown; however, other patterns may also be used. The same pattern also defines the locations and widths of the cantilever beams 20. After patterning of the resist, but prior to etching the epitaxial layer, the wafer is diced into individual chips, each forming a single accelerometer. Then the pattern is etched in the epitaxial layer 38 to define openings such as opening 45 in FIG. 8a used to form the stop 28. Preferably, this etching process is carried out in plasma comprising carbon tetrafluoride and oxygen. By etching the serpentine pattern after cutting the wafer into individual chips, debris from the cutting operation is prevented from entering the chamber surrounding the seismic mass 15. This chamber remains sealed to the ambient until the serpentine pattern is defined. Once the plasma etching process is complete, the resist is stripped with plasma and the resulting accelerometer packaged using any desired package, depending upon the particular application for the accelerometer.

Figure 8A:
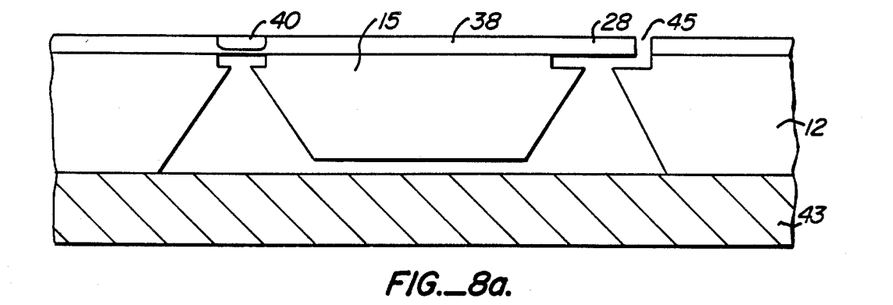
FIG. 8a is a subsequent cross-sectional view illustrating the appearance of the structure after definition of the cantilever beams and stops.
Figure 8B:
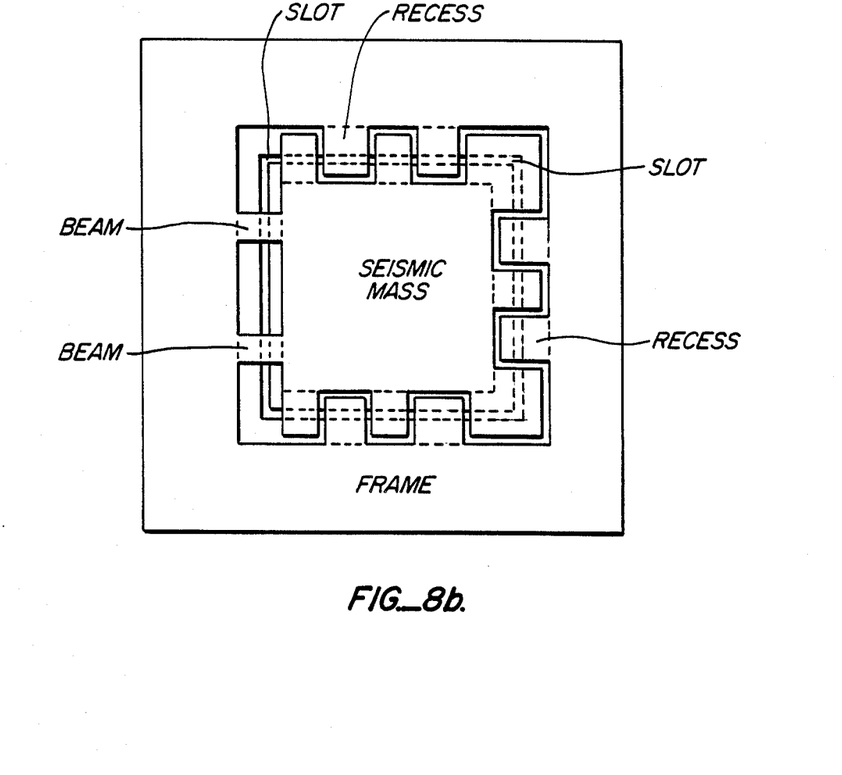
FIG. 8b is a top view of the structure shown in FIG. 8a illustrating the configuration of the serpentine channel and recesses.

FIG. 8b, a top view of the structure shown in cross section in FIG. 8a, illustrates a typical configuration for the serpentine pattern defining the protrusions and cantilever beams. Of course, more or fewer protrusions and more or fewer cantilever beams may be employed depending upon the strength of stops and sensitivity desired for the resulting accelerometer. For example, if the accelerometer is to be subjected to higher g loadings, then wider and/or additional cantilever beams might be employed.

The process of our invention is particularly advantageous because it allows precise control of the travel distance of the seismic mass in either direction. Using proper etching controls, the travel distance can be set within 1 micron or better accuracy. Furthermore, because the distance of travel in either direction is set by a single etching operation, the travel distance in each direction is closely matched. Because no gluing or attachment of materials to the seismic mass is required during formation of the stops, the possibility of trapping dust particles between the seismic mass and the mechanical stops during fabrication is minimized Furthermore, the precision achieved by using such bonding techniques as employed by the inventors allows much more accurate definition of travel than achievable by a technique such as gluing. In gluing, the bonding agent can only be controlled to tolerances of tens of microns or worse. This results in higher fabrication yields than prior art techniques. Furthermore, because fabrication of the mechanical stops employs photolithographic and etching operations, precise alignment of mechanical stop devices is not required in any dimension, in contrast with the prior art. Finally, because of the superior performance of the mechanical stops, viscous damping is not needed to assure survival of the accelerometer during transport and operation. Viscous damping need only be employed to tailor the natural frequency of the device for specific operations.

Typical characteristics for one chip configuration are:

| | |
|---|---|
| Bridge resistance | 5000 Ohm |
| Sensitivity | 10 mV/G at 5 V excitation |
| −3dB frequency | 500 Hz |
| Linearity | <1% at 2 Gs |
| Cross-axis sensitivity | <2% (any axis) |
| Overrange protection | >1000 G (any axis) |

This cantilever accelerometer avoids many of the cost and performance limitations of prior designs. The basic cantilever structure provides high sensitivity for a given chip size. Overrange protection in all three axes is available as a basic property of the chip structure. Air damping is controllable by the use of adjustable gaps.

These advantages translate to small size, low cost, and good performance. The low cost constitutes an applications breakthrough which will permit penetration into new areas including automotive air-bag actuation, automotive active suspensions, motion detection in industrial process controls, military and aerospace components, and consumer and medical applications. The small size ensures that the device will be useful in many applications where space constraints are important.

The foregoing has been a description of the preferred embodiment in which specific chemicals, materials, and the like, have been described to enable a complete understanding of the invention. The scope of the invention may be ascertained from the appended claims. While the device has been described as an preferred embodiment, the invention clearly is useful in force, displacement angle sensors and weight sensors, as well as other applications.

We claim:

1. A sensing device comprising:
   a supporting frame having an opening therein;
   a mass disposed in the opening and movable along at least one axis;
   a flexure coupled between the frame and the mass;
   stop means integral to the supporting frame and the mass and mounted along the respective adjacent edges of the frame and the mass for restricting movement of the mass structure in at least one direction along the at least one axis; and
   sensing means coupled to at least the flexure for detecting movement of the mass structure.

2. A sensing device as in claim 1 wherein the stop means comprises upper and lower stop means for restricting movement of the mass structure to between two positions along the at least one axis.

3. A sensing device as in claim 2 wherein the flexure comprises a cantilever beam.

4. A sensing device as in claim 2 wherein the stop means are positioned in close proximity to both the frame and the mass to provide viscous gaseous damping of the mass.

5. A sensing device as in claim 2 wherein:
the upper stop means comprises a first recess in a surface of the mass and a first projection from the frame disposed to contact the mass when the mass is displaced upwardly from the frame.

6. A sensing device as in claim 5 wherein:
the lower stop means comprises a second recess in a surface of the frame and a second projection from the mass disposed to contact the frame when the mass is displaced downwardly from the frame.

7. A sensing device as in claim 3 wherein:
the frame comprises an annular-shaped body having an opening therethrough and the mass is disposed in the opening; and
the cantilever beam includes an upper surface aligned to an upper surface of the mass.

8. A sensing device as in claim 7 further comprising at least one additional cantilever beam coupled to each of the frame and the mass.

9. A sensing device as in claim 1 wherein each of the mass and the frame comprise monocrystalline silicon.

10. A sensing device as in claim 9 wherein the flexure comprises a cantilever beam integral to both the mass and the frame.

11. A sensing device as in claim 10 further comprising a resistive element disposed on the cantilever beam.

12. A sensing device as in claim 11 wherein the cantilever beam comprises a portion of an epitaxial silicon layer.

13. A sensing device as in claim 1 wherein the sensing means is coupled to the cantilever beam for detecting deflections therein.

14. A sensing device as in claim 13 wherein the sensing means comprises a resistor.

15. An accelerometer comprising:
an annular supporting frame having an opening therethrough, the frame comprising a monocrystalline silicon substrate and an overlying epitaxial layer of monocrystalline silicon;
a mass disposed in the opening and movable along an axis extending through the opening, the mass comprising a monocrystalline silicon substrate and an overlying epitaxial layer of monocrystalline silicon;
a cantilever beam extending between the frame and the mass within the epitaxial layer to couple the mass to the frame;
a plurality of stops within the epitaxial layer, each stop having a protrusion extending from one of the mass or the frame to the other of the mass or frame, each stop including a recess in the other of the mass or frame to define a travel distance between the recess and the protrusion; and
sensing means disposed in the cantilever beam for detecting relative motion between the frame and the mass.

16. An accelerometer as in claim 15 wherein alternate ones of the plurality of stops have protrusions extending from the mass to the frame.

17. An accelerometer as in claim 15 wherein a separation distance is provided between the frame and the mass, which distance is not less at a lower surface of the substrate than at the epitaxial layer.

18. A sensing device with a moving part and a non-moving part, the moving part being located in an opening in the non-moving part, the moving part being capable of a predefined range of motion along one axis, the axis being perpendicular to the non-moving part, and the non-moving part having overrange stops mounted thereon, the stops comprising protrusions on one of the moving or non-moving parts overlapping a recess on the other of the moving or non-moving part for preventing motion of the moving part beyond its predefined range.

19. A sensing device as in claim 18 with bidirectional overrange stops for preventing motion of the moving part beyond its predetermined range in either direction along its one axis of motion, the stops being formed by overlapping protrusions and recesses, both parts having protrusions and recesses' the protrusions and recesses being matched respectively with recesses and protrusions on the other part.

20. A method of fabricating a sensing device comprising:
forming an annular recess extending into a first surface of a substrate, the recess defining a second surface;
forming a layer over the first surface and over the recess, the layer not being in contact with the second surface;
removing an annular-shaped region of the substrate extending from a bottom surface of the substrate to the recess to thereby define a mass; and
removing a selected portion of the layer to define a cantilever beam extending across the recess and to define at least one stop over the recess for preventing movement of the mass beyond a fixed distance in a selected direction.

21. A method as in claim 20 wherein the step of forming comprises:
depositing the layer onto a body;
attaching the layer to the surface of the substrate; and
removing the body.

22. A method as in claim 21 wherein:
the substrate, the body and the layer comprise monocrystalline silicon; and
the step of removing comprises etching the body.

23. A method as in claim 20 wherein the layer comprises at least one of silicon, silicon nitride, and silicon dioxide.

24. A method as in claim 20 wherein the layer comprises a least one of silicon, silicon nitride, silicon dioxide, and metal.

25. A method as in claim 20 further comprising the step of:
forming electronic components in the layer.

26. A method as in claim 20 further comprising the step of:
attaching a backing plate to a third surface of the substrate opposite the first surface.

27. A method as in claim 26 wherein the step of defining an annular recess further comprises:
defining an additional recess in the third surface to provide a space between the backing plate and the mass.

28. A method as in claim 20 wherein the step of removing a selected portion comprises:
removing a serpentine-shaped portion to define at least one pair of coplanar stops for preventing movement of the mass beyond a fixed distance in both of two directions.

29. A method of fabricating an accelerometer comprising:
etching a first annular recess extending into an upper surface of a first silicon substrate, and a second recess extending into a lower surface of the first silicon substrate;
forming an epitaxial silicon layer over a surface of a second silicon substrate;
attaching the epitaxial silicon layer to the upper surface of the first silicon substrate;
removing the second silicon substrate;
forming electronic circuit elements in the epitaxial layer;
removing an annular-shaped region from the first substrate extending from the lower surface to the first annular recess to thereby define a mass and a frame; and
removing a selected portion of the epitaxial layer to define at least one cantilever beam extending between the mass and the frame and to define a plurality of protrusions over the first recess for restricting movement of the mass with respect to the frame.

30. A method as in claim 29 wherein the first substrate comprises a wafer within which a plurality of accelerometers are to be fabricated, and the method further comprises the steps:
attaching a backing plate to the lower surface of the wafer; and
cutting the wafer into a plurality of sections, each containing at least one frame and one mass.

31. A method as in claim 30 wherein the step of attaching follows the step of removing an annular-shaped region.

32. A sensing device comprising:
a supporting frame having an opening therein;
a mass disposed in the opening and movable along at least one axis;
a flexure coupled between the frame and the mass;
stop means integral to the supporting frame and the mass for restricting movement of the mass structure in the at least one direction along the at least one axis; and
sensing means coupled to at least the flexure for detecting movement of the mass structure,
the stop means further comprising an upper and lower stop means for restricting movement of the mass structure to between two positions along the at least one axis, the upper stop means further comprising a first recess in a surface of the mass and a first projection from the frame disposed to contact the mass when the mass is displaced upwardly from the frame.

33. A sensing device as in claim 32 wherein:
the lower stop means comprises a second recess in a surface of the frame and a second projection from the mass disposed to contact the frame when the mass is displaced downwardly from the frame.

34. A method of fabricating a sensing device comprising:
forming an annular recess extending into a first surface of a substrate, the recess defining a second surface;
forming a layer over the first surface and over the recess, the layer not being in contact with the second surface;
removing an annular-shaped region of the substrate extending from a bottom surface of the substrate to the recess to thereby define a mass; and
removing a selected portion of the layer to define a cantilever beam extending across the recess and to define at least one stop over the recess for preventing movement of the mass beyond a fixed distance in a selected direction,
the step of removing a selected portion of the layer further comprising removing a serpentine-shaped portion to define at least one pair of coplanar stops for preventing movement of the mass beyond a fixed distance in both of two directions.

* * * * *